Patented June 9, 1936

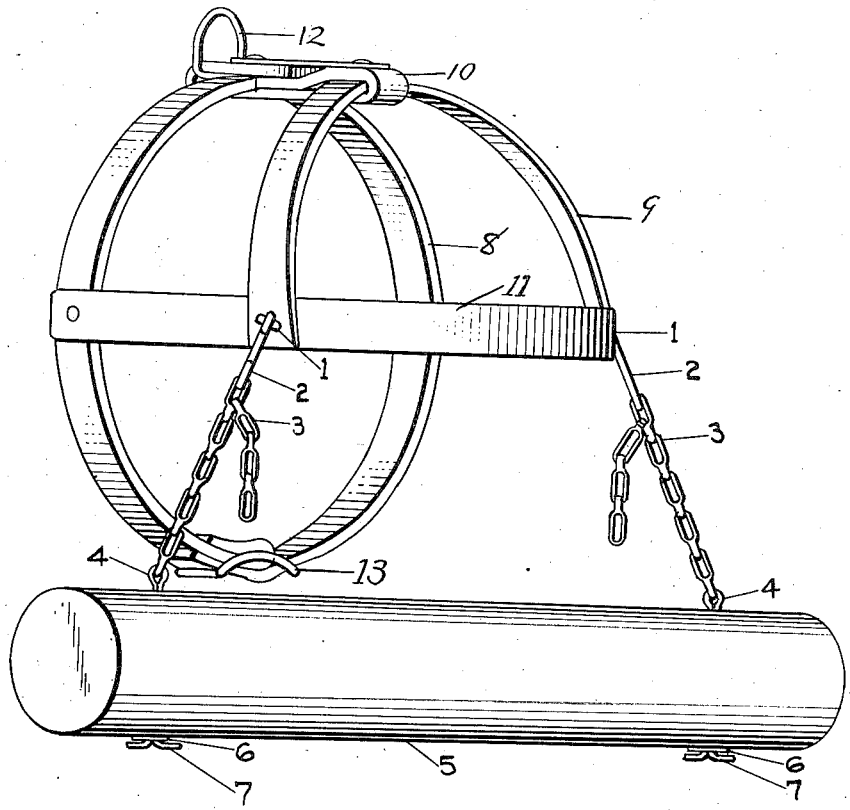

2,043,410

UNITED STATES PATENT OFFICE 2,043,410

TRAMMEL FOR ANIMALS

Charles S. Huber, Davenport, Iowa

Application August 4, 1934, Serial No. 738,469

5 Claims. (Cl. 119—107)

My invention relates to improvements in trammels for animals.

The objects of my invention are to provide a light, easily adjusted trammel for dogs which can be utilized to break them of running after automobiles and to break them of running away or from traveling too fast when on a leash. It may also be applied to other animals if desired.

The drawing shows a perspective view of my trammel.

My apparatus comprises a back strap, 10, girth, 8, neck strap, 9, and breast strap, 11, secured together by rivets, stitching or other suitable means, in the form commonly used for a dog harness, and with a leading ring, 12, secured to the back strap, 10.

This harness is placed upon the dog with the girth, 8, just back of the forelegs and with the neck strap going over the back of his neck and the breast strap extending forwardly around his chest or breast.

A bar, 5, composed preferably of balsa wood or other very light material, has cotter pins, 4, extending through the bar vertically near each end of the bar. The upper end of the cotter pin, 4, is formed in ring shape and the lower end is spread apart as at 7 to secure it in place after passing through a washer, 6. To the upper end of the cotter pin I attach a chain, 3, and the upper end of the chain is secured in a snap, 2, which in turn is held in a ring, 1, formed on the outer end of the cotter pin, or other suitable mounting attached to one end of the neck strap, 9, and which may be utilized to unite the neck strap, 9, and the breast strap, 11.

The girth, 8, may be secured in place by a buckle, 13, and may be made adjustable to fit different sized animals. The neck strap, 9, may also be made adjustable if desired. The height at which the bar, 5, will be carried may be varied by adjusting the chain, 3, relatively to the snap, 2.

In the operation of my apparatus, the harness is placed upon the dog in the usual way, the girth strap, 8, then tightened by the buckle, 13, and the height of the bar, 5, adjusted as desired.

The bar, 5, being preferably made of very light wood such as balsa wood, may be readily moved forward by each of the dog's forelegs in turn in the ordinary movement of walking, but will impede his movements sufficiently to interfere to a considerable extent with his running and has proven very effective to break a dog from running after automobiles or from running away and also from trying to travel too fast when being taken out on a leash.

I prefer to form the bar, 5, of such length that it will project each side of the dog's front legs. When so constructed, it will tend to stay in front of both legs and will avoid the tripping action due to getting between his legs which a shorter bar might cause.

The size and weight of the bar may be varied to meet the requirements of different cases. A strong, older dog will require a larger and heavier bar than a young dog.

I do not limit my claims to the precise structure shown in the drawing, as it is obvious that various modifications thereof can be made without departing from the spirit of my invention.

I claim:

1. A trammel for animals comprising a flexible girth adapted to encircle the body of the animal back of the front legs, a neck strap spaced therefrom, a breast strap united to the girth and the neck strap, and a rod of balsa wood suspended transversely from the neck strap adapted to hang in front of the animal's front legs and limit his freedom of movement thereof.

2. A trammel for dogs comprising a flexible girth adapted to encircle the body of the animal back of the front legs, a neck strap spaced therefrom, a breast strap united to the girth and the neck strap, and a rod of light material suspended transversely from the neck strap by a pair of flexible hangers connected to the rod near opposite ends thereof and to the opposite ends of the neck strap, said rod being adapted to hang free in front of the animal's front legs contacting therewith by force of gravity only, and to limit rapid movement thereof without interfering substantially with slow movement.

3. A trammel for animals comprising a harness having a flexible girth adapted to encircle the body back of the front legs, a neck strap, a breast strap united to the girth and neck strap, and a transverse rod of balsa wood supported by the harness suspended at both ends of the rod and adapted to hang freely in front of the animal's front legs and limit his freedom of movement thereof.

4. A dog trammel comprising a suitable supporting harness of flexible material and a crossbar of balsa wood suspended near both ends therefrom in front of and adapted to contact lightly, by gravity only, with the dog's front legs when wearing the harness and impede the forward movement thereof.

5. A dog trammel comprising a flexible girth adapted to encircle the body of the animal back of the front legs, a neck strap secured at a fixed distance therefrom, and a crossbar of light material adjustably suspended by both ends from the neck strap and adapted to hang in front of the animal's front legs and limit his freedom of movement thereof.

CHARLES S. HUBER.